United States Patent
Adachi et al.

(10) Patent No.: US 11,654,931 B2
(45) Date of Patent: May 23, 2023

(54) DRIVING ASSISTANCE DEVICE AND VEHICLE

(71) Applicant: HONDA MOTOR CO., LTD., Tokyo (JP)

(72) Inventors: Hiroko Adachi, Wako (JP); Ryo Kimura, Wako (JP); Takahiro Matsuoka, Wako (JP); Tsuyoshi Nojiri, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/668,174

(22) Filed: Feb. 9, 2022

(65) Prior Publication Data

US 2022/0289230 A1   Sep. 15, 2022

(30) Foreign Application Priority Data

Mar. 12, 2021   (JP) .............................. JP2021-040666

(51) Int. Cl.
  *B60W 50/16*   (2020.01)
  *B60K 35/00*   (2006.01)
  *B60W 50/14*   (2020.01)

(52) U.S. Cl.
  CPC ............. *B60W 50/16* (2013.01); *B60K 35/00* (2013.01); *B60K 2370/1529* (2019.05); *B60K 2370/52* (2019.05); *B60W 2050/146* (2013.01); *B60W 2540/10* (2013.01); *B60W 2540/12* (2013.01)

(58) Field of Classification Search
  CPC ........... B60W 50/16; B60W 2050/146; B60W 2540/10; B60W 2540/12; B60K 35/00; B60K 2370/1529; B60K 2370/52
  See application file for complete search history.

(56) References Cited

U.S. PATENT DOCUMENTS 6,154,123 A * 11/2000 Kleinberg .............. G08B 21/06
                                                340/576
7,102,496 B1 * 9/2006 Ernst, Jr. .......... G08G 1/096725
                                                340/436

(Continued)

FOREIGN PATENT DOCUMENTS

CN       108622103 A  * 10/2018  ............ B60W 40/09
EP       1607262 A1  * 12/2005  ........... B60K 26/021

(Continued)

*Primary Examiner* — Chico A Foxx
(74) *Attorney, Agent, or Firm* — Thomas | Horstemeyer, LLP (57) ABSTRACT

The present invention provides a driving assistance device that assists driving of a vehicle, the driving assistance device including a notification unit configured to perform notification for recognition of a risk associated with traveling of the vehicle present in a surrounding situation to a driver of the vehicle, a determination unit configured to determine a degree of recognition of the risk by the driver based on a period of time from when a first detector no longer detects an accelerator operation to when a second detector detects the brake operation in response to the risk present in the surrounding situation, and a control unit configured to control the notification unit so that the notification according to the degree of recognition determined by the determination unit is performed.

13 Claims, 4 Drawing Sheets

(56) References Cited

U.S. PATENT DOCUMENTS

| | | | |
|---|---|---|---|
| 7,124,027 B1* | 10/2006 | Ernst, Jr. | B60W 30/09 701/301 |
| 8,145,389 B2 | 3/2012 | Kobayashi | B60K 31/0008 701/36 |
| 9,396,662 B2* | 7/2016 | Bousquet | G08G 5/065 |
| 9,493,118 B1* | 11/2016 | Laur | G08G 1/166 |
| 10,627,812 B2* | 4/2020 | Eggert | G05D 1/0088 |
| 2005/0090984 A1* | 4/2005 | Kobayashi | B60K 31/0008 340/436 |
| 2005/0288844 A1* | 12/2005 | Kimura | B60W 10/04 701/100 |
| 2007/0198136 A1* | 8/2007 | Kobayashi | B60K 26/021 701/1 |
| 2008/0042813 A1* | 2/2008 | Wheatley | B60Q 9/008 340/439 |
| 2008/0201039 A1* | 8/2008 | Matsuoka | B60W 50/16 701/41 |
| 2011/0140968 A1* | 6/2011 | Bai | G08G 1/163 342/454 |
| 2011/0288774 A1* | 11/2011 | Bengtsson | G08G 1/165 701/301 |
| 2012/0161980 A1* | 6/2012 | Bonne | G08G 1/167 340/905 |
| 2012/0212353 A1* | 8/2012 | Fung | B60W 10/18 701/1 |
| 2012/0265418 A1* | 10/2012 | Foerster | B60W 10/06 701/70 |
| 2014/0035737 A1* | 2/2014 | Rashid | B60Q 9/008 340/435 |
| 2015/0166058 A1* | 6/2015 | Mizutani | B60K 35/00 701/1 |
| 2016/0229397 A1* | 8/2016 | Muthukumar | B60R 21/013 |
| 2017/0113683 A1* | 4/2017 | Mudalige | B60W 30/18145 |
| 2017/0197549 A1* | 7/2017 | Vladimerou | B60W 30/08 |
| 2017/0221334 A1* | 8/2017 | Zhang | G01S 5/10 |
| 2018/0231974 A1* | 8/2018 | Eggert | B60W 60/0027 |
| 2018/0257642 A1* | 9/2018 | Sherony | B60W 30/12 |
| 2019/0337533 A1* | 11/2019 | Kume | B60W 50/14 |
| 2020/0239018 A1* | 7/2020 | Tudosie | B60W 60/0059 |
| 2020/0247421 A1* | 8/2020 | Yoshida | B60R 16/02 |
| 2021/0046935 A1* | 2/2021 | Mizoguchi | B60W 50/085 |
| 2021/0237770 A1* | 8/2021 | Kawakami | B62D 15/025 |
| 2021/0284174 A1* | 9/2021 | Wang | G07C 5/0808 |
| 2021/0316660 A1* | 10/2021 | Kopp | G01S 15/931 |
| 2021/0323542 A1* | 10/2021 | Naka | B60W 50/10 |
| 2021/0370891 A1* | 12/2021 | Hanada | B60W 40/08 |
| 2022/0097715 A1* | 3/2022 | Sumikawa | B60W 40/09 |
| 2022/0101752 A1* | 3/2022 | Sumikawa | G07C 5/0833 |
| 2022/0212665 A1* | 7/2022 | Tanaka | B60W 60/001 |
| 2022/0219656 A1* | 7/2022 | Asano | B60T 8/17616 |
| 2022/0266819 A1* | 8/2022 | Itoh | B60W 50/0098 |
| 2022/0281443 A1* | 9/2022 | Sung | B60W 40/08 |
| 2022/0306103 A1* | 9/2022 | Ueyama | B60W 40/105 |
| 2022/0306137 A1* | 9/2022 | Manabe | B60W 40/105 |
| 2022/0340129 A1* | 10/2022 | Zhou | B60W 30/18118 |

FOREIGN PATENT DOCUMENTS

| | | | | |
|---|---|---|---|---|
| EP | 1609655 A2 | * | 12/2005 | B60K 26/021 |
| EP | 1669238 A2 | * | 6/2006 | B60K 31/0008 |
| EP | 2682318 A1 | * | 1/2014 | B60Q 9/008 |
| JP | 2018-167647 A | | 11/2018 | |
| WO | WO-2005084992 A1 | * | 9/2005 | B60K 26/021 |

* cited by examiner

DRIVING ASSISTANCE DEVICE AND VEHICLE

CROSS-REFERENCE TO RELATED APPLICATION(S)

This application claims priority to and the benefit of Japanese Patent Application No. 2021-040666 filed on Mar. 12, 2021, the entire disclosure of which is incorporated herein by reference.

BACKGROUND OF THE INVENTION

Field of the Invention

The present invention relates to a driving assistance device and a vehicle.

Description of the Related Art

Regarding a vehicle represented by a four-wheeled vehicle, in recent years, various driving assistance techniques for assisting driving of a driver (occupant) have been proposed in Japanese Patent Laid-Open No. 2018-167647. Japanese Patent Laid-Open No. 2018-167647 discloses a driving assistance system that provides assistance for avoiding collision with an obstacle and preventing deviation from a traveling path based on an external situation of a vehicle (a surrounding situation related to an external environment of the vehicle) and an operation situation related to a driving operation of the driver.

However, in order to effectively operate a driving assistance technique, that is, to sufficiently exhibit an effect of a driving assistance technique, not only the external situation and the operation situation but also the acceptability of the driver to the driving assistance technique is an important factor. Therefore, it is desirable to develop a technique for assisting driving in accordance with the driver's recognition of the risk (accident risk) of the surrounding situation of the vehicle.

SUMMARY OF THE INVENTION

The present invention provides a new technique advantageous for assisting driving of a vehicle represented by a four-wheeled vehicle.

According to one aspect of the present invention, there is provided a driving assistance device that assists driving of a vehicle, the driving assistance device including a first detector configured to detect a driver's accelerator operation on an accelerator operator provided in the vehicle, a second detector configured to detect a driver's brake operation on a brake operator provided in the vehicle, a third detector configured to detect a surrounding situation of the vehicle, a notification unit configured to perform notification for recognition of a risk associated with traveling of the vehicle present in the surrounding situation detected by the third detector to a driver of the vehicle, a determination unit configured to determine a degree of recognition of the risk by the driver based on a period of time from when the first detector no longer detects the accelerator operation to when the second detector detects the brake operation in response to the risk present in the surrounding situation detected by the third detector, and a control unit configured to control the notification unit so that the notification according to the degree of recognition determined by the determination unit is performed.

Further objects or other aspects of the present invention will be clarified by embodiments described below with reference to the accompanying drawings.

DESCRIPTION OF THE EMBODIMENTS

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

Figure 1:
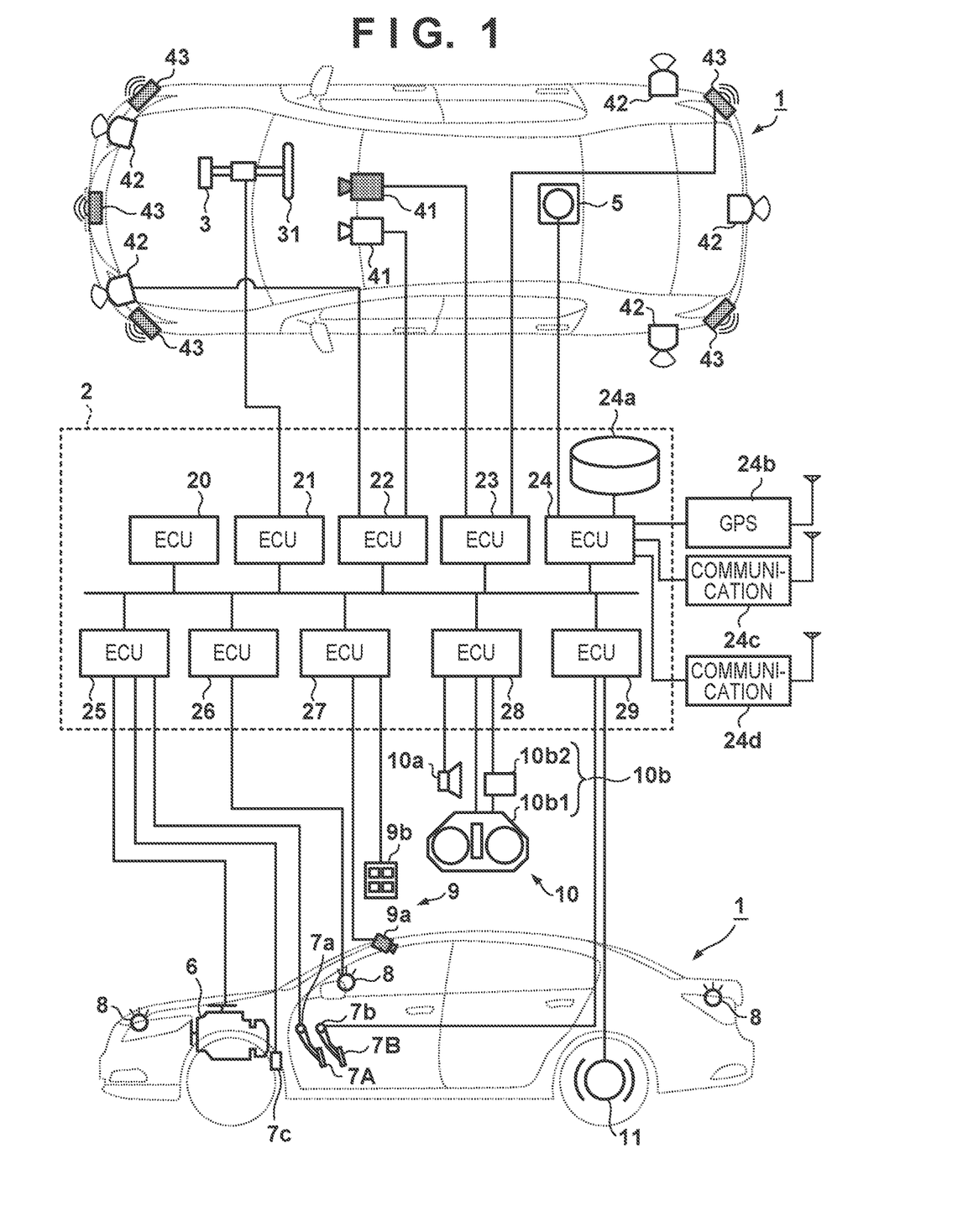
FIG. 1 is a view illustrating a vehicle according to one aspect of the present invention and a configuration of a control device.

FIG. 1 is a view illustrating a vehicle 1 according to one aspect of the present invention, and a configuration of a control device that controls the vehicle 1. In FIG. 1, the vehicle 1 is schematically illustrated in a plan view and a side view. The vehicle 1 is, for example, a sedan-type four-wheel passenger vehicle (four-wheeled vehicle).

Referring to FIG. 1, the configuration of the control device that controls the vehicle 1 will be described. In the present embodiment, the control device that controls the vehicle 1 functions as a part of a driving assistance device that assists driving of the vehicle 1, and includes a control unit configured by an ECU group 2. The ECU group 2 includes a plurality of ECUs 20 to 29 configured to be capable of communicating with one another. Each of the ECUs 20 to 29 includes a processor represented by a CPU, a storage device such as a semiconductor memory, an interface with an external device, and the like. In the storage device, programs executed by the processor, data used for processing by the processor, and the like are stored. Each of the ECUs 20 to 29 may include a plurality of processors, storage devices, interfaces, and the like.

Hereinafter, functions and the like assigned to the ECUs 20 to 29 will be described. Note that the number of ECUs and the functions assigned to the ECUs can be designed as appropriate, and can be subdivided or integrated, as compared with the present embodiment.

The ECU 20 conducts control related to driving assistance (traveling assistance) including automated driving of the vehicle 1. In the automated driving, the ECU 20 automatically controls driving (acceleration or the like of the vehicle 1 by a power plant 6), steering, and braking of the vehicle 1 without requiring a driver's (occupant's) operation. Further, in manual driving, the ECU 20 controls driving assistance such as collision reducing brake and lane deviation suppression, for example.

In the collision reducing brake, when a possibility of collision with an obstacle in front of the vehicle 1 (a risk associated with traveling of the vehicle 1) increases, the ECU 20 automatically operates a brake device 11 to assist collision avoidance and performs notification to the driver so that the driver recognizes the possibility of collision with the obstacle. In the lane deviation suppression, when a possibility that the vehicle 1 deviates from a traveling lane increases, the ECU 20 automatically operates a steering wheel 31 to assist lane deviation avoidance and performs notification to the driver so that the driver recognizes the lane deviation.

The ECU 21 controls an electric power steering device 3. The electric power steering device 3 includes a mechanism that steers front wheels in accordance with a driver's operation (steering operation) on the steering wheel 31. In addition, the electric power steering device 3 includes a motor that exerts a driving force for assisting the steering operation or automatically steering the front wheels, a sensor that detects a steering angle, and the like. When the driving state of the vehicle 1 is automated driving, the ECU 21 automatically controls the electric power steering device 3 in response to an instruction from the ECU 20 and controls an advancing direction of the vehicle 1.

Figure 2:
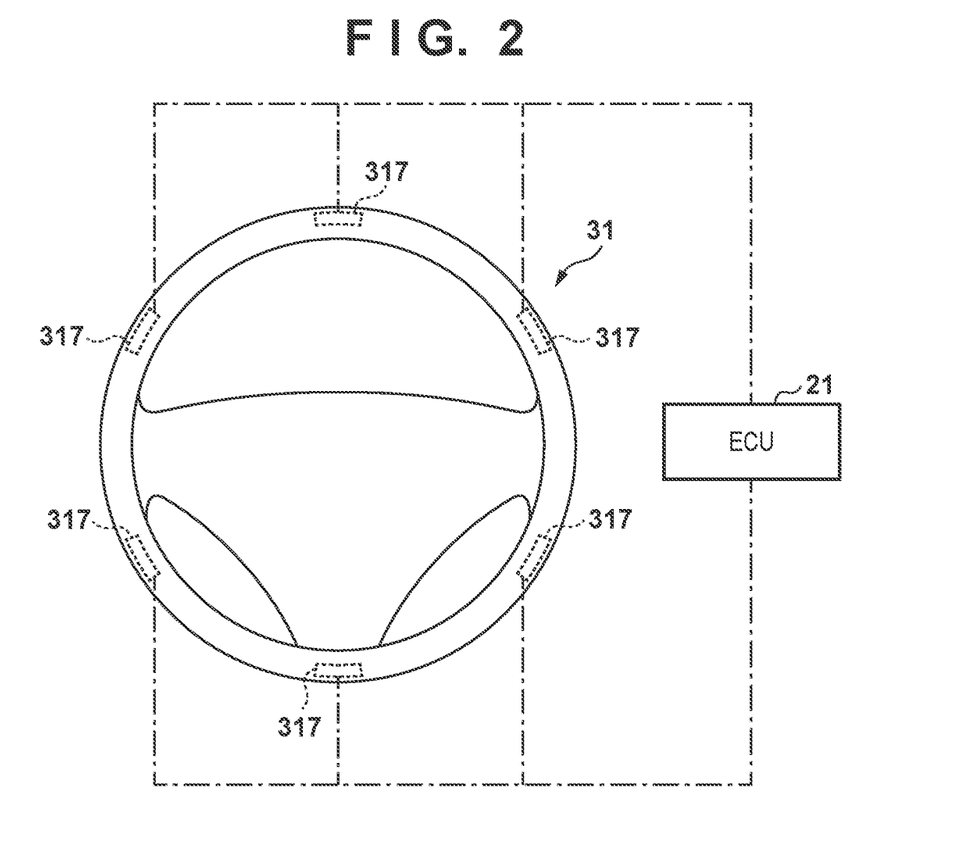
FIG. 2 is a diagram illustrating a configuration of a steering wheel.

FIG. 2 is a diagram illustrating a configuration of the steering wheel 31. The steering wheel 31 has a circular shape, and has a vibrating element 317 incorporated in a plurality of portions in the circumferential direction thereof. In the present embodiment, as illustrated in FIG. 2, the vibrating element 317 is incorporated at equal intervals (60 degree intervals) at six locations including the upper, lower, left, and right of the steering wheel 31 and therebetween. The vibrating element 317 is, for example, a vibration motor that generates vibration by supplying electric power. The ECU 21 supplies electric power to the vibrating element 317 to control drive thereof.

The ECUs 22 and 23 are units that recognize a risk present in a surrounding situation of the vehicle 1, that is, a risk associated with traveling of the vehicle 1 based on detection results of detection units 41 to 43 that detect the surrounding situation of the vehicle 1. The detection unit 41 is a camera that photographs the front of the vehicle 1 (hereinafter, it may be referred to as a "camera 41"). In the present embodiment, two cameras 41 are provided in a front portion of a roof of the vehicle 1. By analyzing the image that has been photographed by the camera 41, it is possible to extract a contour of a target object or extract a division line (e.g., white line) or the like of a lane on a road. As a result, the ECUs 22 and 23 can detect (recognize) other vehicles and pedestrians, and more specifically, can recognize a risk associated with traveling of the vehicle 1 such as a vehicle ahead and a pedestrian ahead (obstacle).

The detection unit 42 is a light detection and ranging (LIDAR) ((e.g., a laser radar) hereinafter, it may be referred to as a LIDAR 42). The LIDAR 42 detects a target object around the vehicle 1 and measures a distance to the target object. In the present embodiment, five LIDARs 42 are provided, one at each corner portion of a front portion of the vehicle 1, one at the center of a rear portion of the vehicle 1, and one at each side of the rear portion of the vehicle 1. The detection unit 43 is a millimeter wave radar (hereinafter, it may be referred to as a "radar 43".). The radar 43 detects a target object around the vehicle 1 and measures a distance to the target object. In the present embodiment, five radars 43 are provided, one at the center of the front portion of the vehicle 1, one at each corner portion of the front portion of the vehicle 1, and one at each corner portion of the rear portion of the vehicle 1.

The ECU 22 controls one camera 41 and each LIDAR 42 and performs information processing on the detection result. The ECU 23 controls the other camera 41 and each radar 43 and performs information processing on the detection result. As described above, since two sets of devices for detecting the surrounding situation of the vehicle 1 are provided, the reliability of the detection results can be improved, and since different types of detection units such as a camera, a LIDAR, and a radar are provided, the surrounding environment of the vehicle can be analyzed in multiple ways. Further, the ECUs 22 and 23 can detect a relative speed between the vehicle 1 and the target object around the vehicle 1 based on the distance between the vehicle 1 and the target object around the vehicle 1 detected by the LIDAR 42 and the radar 43, respectively, and can detect an absolute speed of the target object around the vehicle 1 further based on the absolute speed information of the vehicle 1.

The ECU 24 controls a gyro sensor 5, a global positioning system (GPS) sensor 24b, and a communication device 24c, and performs information processing on a detection result or a communication result. The gyro sensor 5 detects a rotational motion of the vehicle 1. The course of the vehicle 1 can be determined based on the detection result of the gyro sensor 5, the wheel speed, and the like. The GPS sensor 24b detects the current location of the vehicle 1. The communication device 24c conducts wireless communication with a server that provides map information and traffic information, and acquires these pieces of information. The ECU 24 is capable of accessing a map information database 24a constructed in the storage device, and conducts a route search and the like from the current position to a destination. The ECU 24 includes a communication device 24d for vehicle-to-vehicle communication. The communication device 24d conducts wireless communication with other surrounding vehicles to exchange information between the vehicles.

The ECU 25 controls the power plant 6. The power plant 6 is a mechanism that outputs a driving force for rotating driving wheels of the vehicle 1 and includes, for example, an engine and a transmission. For example, the ECU 25 controls the output of the engine according to a driver's accelerator operation (acceleration operation) detected by an operation detection sensor 7a provided on an accelerator pedal 7A and switches a gear ratio of the transmission based on information such as the vehicle speed detected by a vehicle speed sensor 7c. When the driving state of the vehicle 1 is automated driving, the ECU 25 automatically controls the power plant 6 in response to an instruction from the ECU 20 and controls the acceleration and deceleration of the vehicle 1.

The ECU 26 controls lighting devices (headlights, taillights, and the like) including direction indicators 8a (blinkers). In the present embodiment, the direction indicators 8a are provided in the front portion, door mirrors, and the rear portion of the vehicle 1.

The ECU 27 controls a detection unit 9 that detects a situation inside the vehicle and performs information processing on a detection result. In the present embodiment, as the detection unit 9, a camera 9a that photographs the inside of the vehicle and an input device 9b that receives an input of information from an occupant in the vehicle are provided. In the present embodiment, the camera 9a is provided in the front portion of the roof of the vehicle 1 and photographs an occupant (e.g., driver) in the vehicle. The input device 9b is a switch group that is arranged at a position where the occupant in the vehicle can operate it and is used to input an instruction to the vehicle 1.

The ECU 28 controls an output device 10. The output device 10 outputs information to the driver and receives an input of information from the driver. A voice output device 10a notifies the driver of information by voice. A display device 10b notifies the driver of information by displaying an image. The display device 10b includes, for example, an instrument panel 10b1 disposed in front of the driver's seat and a head-up display 10b2 provided above the instrument panel 10b1. Note that, although the voice and the display have been exemplified in the present embodiment, information may be notified by using vibration or light. In addition, information may also be notified by using a combination of some of voice, display, vibration, and light.

The ECU 29 controls the brake device 11 and a parking brake (not illustrated). The brake device 11 is, for example, a disc brake device, and is provided on each wheel of the vehicle 1 to decelerate or stop the vehicle 1 by applying resistance to the rotation of the wheel. The ECU 29 controls the operation of the brake device 11 according to the driver's brake operation (braking operation) detected by an operation detection sensor 7b provided on a brake pedal 7B, for example. When the driving state of the vehicle 1 is automated driving, the ECU 29 automatically controls the brake device 11 in response to an instruction from the ECU 20 and controls the deceleration and stop of the vehicle 1. The brake device 11 and the parking brake can also be operated to maintain a stopped state of the vehicle 1. In addition, when the transmission of the power plant 6 is provided with a parking lock function, the parking lock function is also capable of operating to maintain the stopped state of the vehicle 1.

In the vehicle 1 configured in this manner, as described above, for example, a collision reducing brake that performs assistance in stages for collision avoidance and damage reduction with an obstacle (preceding vehicle, oncoming vehicle, pedestrian, etc.) in front of the vehicle 1 is provided as a driving assistance technique for assisting driving of the vehicle 1. However, the present inventors have found that when the collision reducing brake (driving assistance technique) is provided to the driver of the vehicle 1, it is necessary not only to consider the surrounding situation and the operation situation of the vehicle 1 but also to consider the acceptability of the driver to the collision reducing brake, specifically, the driver's recognition of the risk associated with traveling of the vehicle 1 present in the surrounding situation of the vehicle 1. For example, in recent years, in the collision reducing brake, for the purpose of reducing a risk in driving of the vehicle 1, notification for recognition of a risk (possibility of collision with an obstacle) associated with traveling of the vehicle 1 tends to be performed early. However, when the driver does not recognize the risk, such notification may lead to dissatisfaction (incomprehension) for the driver. In particular, if the notification for recognition of the risk associated with traveling of the vehicle 1 is performed early to a driver whose driving operation of the vehicle 1 is determined without being affected by the collision reducing brake, the use of the collision reducing brake is refrained (the collision reducing brake is turned off), and an effect of the collision reducing brake may not be exhibited.

Therefore, the present embodiment provides a technique for controlling notification for recognition of a risk associated with traveling of the vehicle 1 present in the surrounding situation of the vehicle 1 in accordance with the driver's recognition of the risk when providing the driving assistance technique such as the collision reducing brake.

Hereinafter, the collision reducing brake provided as a driving assistance technique in the present embodiment will be specifically described. In the collision reducing brake in the present embodiment, notification is performed for recognition of a risk associated with traveling of the vehicle 1 present in the surrounding situation of the vehicle 1, that is, a possibility of collision with an obstacle in front of the vehicle 1 before the brake device 11 is automatically operated to assist in avoiding collision with the obstacle.

Figure 3:
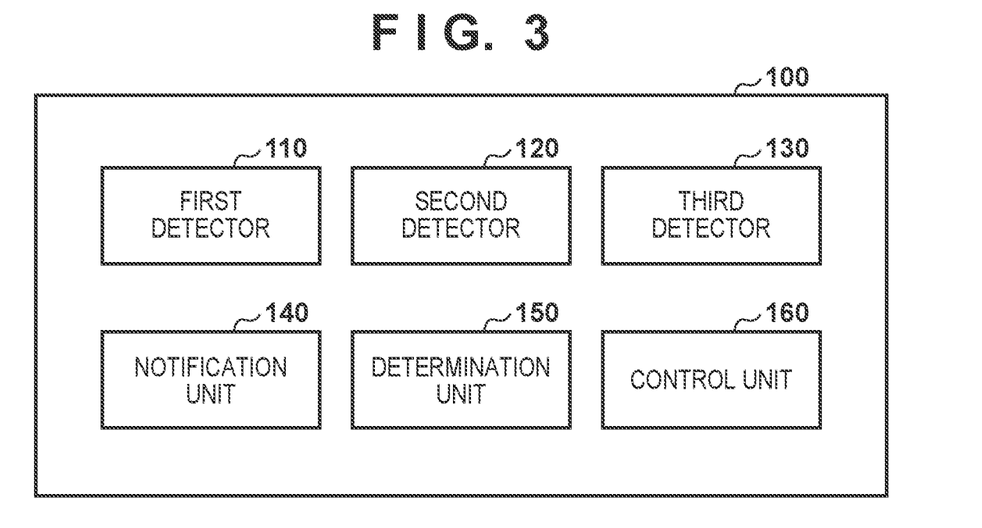
FIG. 3 is a block diagram illustrating a functional configuration of a driving assistance device.

FIG. 3 is a block diagram illustrating a functional configuration of a driving assistance device 100 that provides the collision reducing brake in the present embodiment. The driving assistance device 100 is basically configured by the ECU group 2, and is also configured by appropriately including various units provided in the vehicle 1 as components. As illustrated in FIG. 3, in the present embodiment, the driving assistance device 100 includes a first detector 110, a second detector 120, a third detector 130, a notification unit 140, a determination unit 150, and a control unit 160. Note that the respective functions (blocks) to be described below may be integrated together or separated from each other, and a function to be described may be implemented by another block. In addition, a function to be described as hardware may be realized by software, and vice versa.

The first detector 110 has a function of detecting a driver's accelerator operation on the accelerator pedal 7A which is an accelerator operator provided in the vehicle 1. In the present embodiment, the first detector 110 includes the operation detection sensor 7a provided on the accelerator pedal 7A and the ECU 25 connected to the operation detection sensor 7a.

The second detector 120 has a function of detecting a driver's brake operation on the brake pedal 7B which is a brake operator provided in the vehicle 1. In the present embodiment, the second detector 120 includes the operation detection sensor 7b provided on the brake pedal 7B and the ECU 29 connected to the operation detection sensor 7b.

The third detector 130 has a function of detecting the surrounding situation of the vehicle 1. In the present embodiment, the third detector 130 includes the camera 41, the LIDAR 42, and the radar 43 that are detection units provided in the vehicle 1, and the ECUs 22 and 23 connected thereto.

The notification unit 140 has a function of performing a notification to the driver of the vehicle 1 so that the driver recognizes a risk associated with traveling of vehicle 1 present in the surrounding situation of the vehicle 1 detected by the third detector 130. In the present embodiment, the notification unit 140 includes the vibrating elements 317 incorporated in the steering wheel 31 and the ECU 21 connected to the vibrating elements 317. The notification unit 140 performs notification (risk notification) to the driver so that the driver recognizes a risk associated with traveling of the vehicle 1 by vibrating the steering wheel 31 gripped by the driver with the vibrating element 317.

The determination unit 150 has a function of determining a degree of recognition of the risk (risk recognition degree) by the driver based on a period of time from when the first detector 110 no longer detects the driver's accelerator operation on the accelerator pedal 7A to when the second detector 120 detects the driver's brake operation on the brake pedal 7B (that is, a period of time from when the driver recognizes the risk to when the driver reacts to the risk (brakes the vehicle 1)) in response to the risk present in the surrounding situation of the vehicle 1 detected by the third detector 130. In this manner, the determination unit 150 determines characteristics of driver's recognition of the risk in front of the vehicle 1 (tendency of risk recognition) according to a timing at which the driver releases the accelerator pedal 7A and a timing at which the driver steps on the brake pedal 7B. In the present embodiment, the determination unit 150 includes the ECU 20 that integrally controls the ECUs 22, 23, 25, and 29.

For example, when the period of time from when the first detector 110 no longer detects the driver's accelerator operation on the accelerator pedal 7A to when the second detector 120 detects the driver's brake operation on the brake pedal 7B is equal to or longer than a reference time, it is considered that the driver potentially weakly recognizes the risk or does not recognize the risk. Therefore, the determination unit 150 determines that such a driver has a low risk recognition degree, and determines that the driver belongs to a first attribute in which the risk recognition degree is lower than a reference.

On the other hand, when the period of time from when the first detector 110 no longer detects the driver's accelerator operation on the accelerator pedal 7A to when the second detector 120 detects the driver's brake operation on the brake pedal 7B is shorter than the reference time, it is considered that the driver potentially strongly recognizes the risk or recognizes the risk. Therefore, the determination unit 150 determines that such a driver has a high risk recognition degree, and determines that the driver belongs to a second attribute in which the risk recognition degree is higher than the reference.

The control unit 160 has a function of controlling the notification unit 140 so that the risk notification is performed to the driver of the vehicle 1 according to the risk recognition degree of the driver determined by the determination unit 150 or which attribute the driver belongs to, the first attribute or the second attribute. For example, the control unit 160 controls the notification unit 140 so as to change a specification of the risk notification according to the risk recognition degree of the driver. In the present embodiment, the control unit 160 includes the ECU 20 that integrally controls the ECUs 21, 22, 23, 25, and 29.

As described above, in the present embodiment, the risk recognition degree of the driver is determined (estimated) based on the period of time from when the driver's accelerator operation is no longer detected to when the driver's brake operation is detected in response to the risk present in the surrounding situation of the vehicle 1, and the risk notification according to the determined risk recognition degree is then performed. This makes it possible to perform risk notification suitable for (the risk recognition degree of) the driver. As a result, the effect of the collision reducing brake can be sufficiently exhibited without giving the driver a sense of discomfort to the risk notification.

In the present embodiment, when the collision reducing brake is provided, the third detector 130 detects, as the surrounding situation of the vehicle 1, a situation ahead in an advancing direction of the vehicle 1, specifically, a situation in a substantially semicircular range with a radius of 200 m to 400 m around the vehicle 1. In this manner, by limiting the range in which the risk present in the surrounding situation of the vehicle 1 is detected to a predetermined range in front of the vehicle 1, that is, a range within an effective field of view assumed to be visually observed by the driver, it is possible to eliminate a risk outside the standard to be excluded when the risk recognition degree of the driver is determined. In other words, when the risk recognition degree of the driver is determined, it is preferable to consider only a risk present in the range within the effective field of view of the driver. Note that the risk outside the standard to be excluded when the risk recognition degree of the driver is determined includes, for example, a vehicle approaching from a blind spot of the vehicle 1 detected by vehicle-to-vehicle communication, a two-wheeled vehicle rapidly approaching (rapidly accelerating) from the side of the vehicle 1, and the like. In response to such a risk outside the standard, notification for recognition of the risk outside the standard can be performed, for example, by outputting voice from the voice output device 10a, or the like.

Here, specific examples of the risk notification according to the risk recognition degree of the driver and the attribute (the first attribute or the second attribute) to which the driver belongs, performed by the collision reducing brake in the present embodiment will be described.

Figure 4:
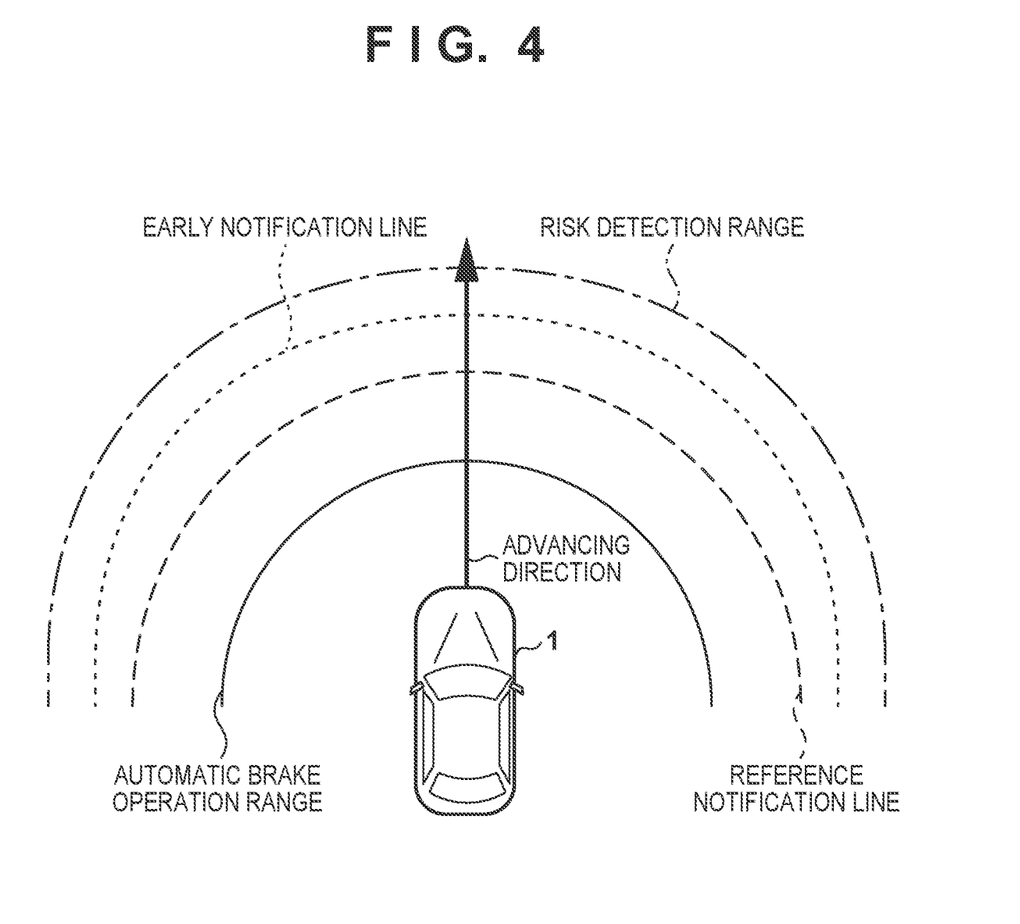
FIG. 4 is a diagram for describing a collision reducing brake in the present embodiment.

For example, as a driver's driving operation of the vehicle 1, a case is considered in which an operation amount of the accelerator pedal 7A corresponding to the driver's accelerator operation detected by the first detector 110 in response to the risk present in the surrounding situation of the vehicle 1 detected by the third detector 130 is equal to or less than a predetermined operation amount. In this case, since the driver does not loosen (or does not stop) the accelerator operation on the accelerator pedal 7A while recognizing the risk present in the surrounding situation of the vehicle 1 detected by the third detector 130, that is, the range within the effective field of view, it is considered that the driver has a low risk recognition degree or a low ability to recognize a distant place. In such a case, in the present embodiment, the control unit 160 controls the notification unit 140 so that a timing of starting the risk notification is earlier than a reference timing. For example, as shown in FIG. 4, by changing (setting) a line that defines the timing of starting the risk notification in response to the risk present in the surrounding situation of the vehicle 1 from a reference notification line to an early notification line, the timing of starting the risk notification can be made earlier than the reference timing. This causes the driver having a low risk recognition degree or a low ability to recognize a distant place to early recognize the risk present in the surrounding situation of the vehicle 1 detected by the third detector 130. FIG. 4 is a diagram illustrating a relationship between a reference notification line to be set when the timing of starting the risk notification is set as a reference timing and an early notification line to be set when the timing of starting the risk notification is earlier than the reference timing. Note that FIG. 4 also illustrates a risk detection range in which the third detector 130 detects (a risk present in) the surrounding situation of vehicle 1, and an automatic brake operation range in which the ECU 29 automatically operates the brake device 11. Referring to FIG. 4, the reference notification line and the early notification line are set in a range between the risk detection range and the automatic brake operation range, and the early notification line is set outside the reference notification line with reference to the vehicle 1.

As the driver's driving operation of the vehicle 1, a case is considered in which the period of time from when the first detector 110 no longer detects the driver's accelerator operation on the accelerator pedal 7A to when the second detector 120 detects the driver's brake operation on the brake pedal 7B is equal to or longer than the reference time in response to the risk present in the surrounding situation of the vehicle 1 detected by the third detector 130. In this case, the driver recognizes the risk present in the surrounding situation of the vehicle 1 detected by the third detector 130, that is, the range within the effective field of view. However, since the driver potentially weakly recognizes the risk (so-called overconfident), the driver is determined to have a low risk recognition degree and is determined to belong to the first attribute in which the risk recognition degree is lower than the reference, as described above. In such a case, in the present embodiment, the control unit 160 controls the notification unit 140 so that the notification intensity of the risk notification gradually increases from when the risk present in the surrounding situation of the vehicle 1 is detected to when the first detector 110 no longer detects the accelerator operation (from when the risk is detected to when the accelerator operation is turned off), and the notification intensity of the risk notification gradually decreases from when the first detector 110 no longer detects the accelerator operation to when the second detector 120 detects the brake operation (from when the accelerator operation is turned off to when the brake operation is turned on).

Figure 5:
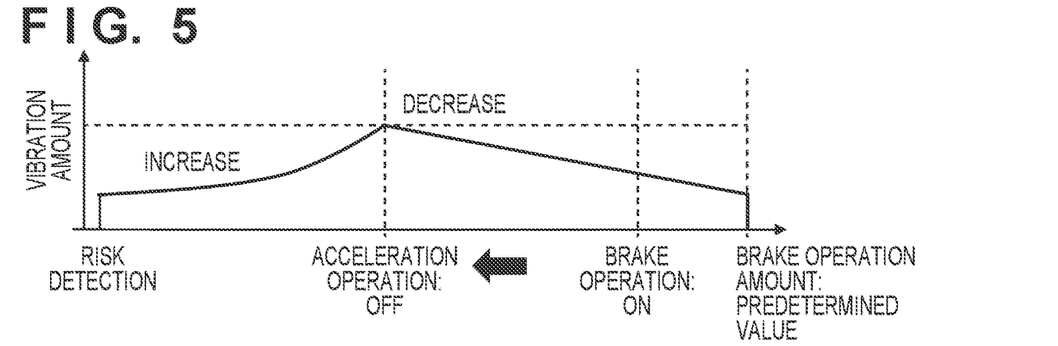
FIG. 5 is a diagram for describing a collision reducing brake in the present embodiment.

In the present embodiment, since the risk notification is performed by vibrating the steering wheel 31 gripped by the driver with the vibrating element 317, as illustrated in FIG. 5, a vibration amount of the steering wheel 31 caused by the vibrating element 317 is gradually increased from when a risk is detected to when the accelerator operation is turned off, and the vibration amount of the steering wheel 31 caused by the vibrating element 317 is gradually decreased from when the accelerator operation is turned off to when the brake operation is turned on. Further, until an operation amount of the brake operation becomes equal to or less than a predetermined amount, the vibration of the steering wheel 31 is continued while the vibration amount of the steering wheel 31 caused by the vibrating element 317 is gradually decreased. As described above, the risk notification in which the vibration amount of the steering wheel 31 is weak and the steering wheel is vibrated long is performed to the driver determined to have a low risk recognition degree and belonging to the first attribute in which the risk recognition degree is lower than the reference, thereby making it possible to advance the timing at which the driver turns off the accelerator operation, leading to risk avoidance (reduction in accident risk). In addition, since such risk notification is not excessive for the driver determined to have a low risk recognition degree and belonging to the first attribute in which the risk recognition degree is lower than the reference, it is possible to suppress the use of the collision reducing brake from being refrained (the collision reducing brake is turned off). Note that the operation amount (predetermined amount) of the brake operation includes, for example, a stepping amount of the brake pedal 7B and a total amount obtained by multiplying the stepping amount of the brake pedal 7B by time.

As the driver's driving operation of the vehicle 1, a case is considered in which the period of time from when the first detector 110 no longer detects the driver's accelerator operation on the accelerator pedal 7A to when the second detector 120 detects the driver's brake operation on the brake pedal 7B is shorter than the reference time in response to the risk present in the surrounding situation of the vehicle 1 detected by the third detector 130. In this case, the driver accurately recognizes the surrounding situation of the vehicle 1 detected by the third detector 130, that is, the risk present in the range within the effective field of view, and potentially strongly recognizes the risk. Therefore, as described above, the risk recognition degree is determined to be high, and the risk recognition degree is determined to belong to the second attribute that is higher than the reference. In such a case, in the present embodiment, the control unit 160 controls the notification unit 140 so that the notification intensity of the risk notification gradually increases from when the risk present in the surrounding situation of the vehicle 1 is detected to when the first detector 110 no longer detects the accelerator operation (from when the risk is detected to when the accelerator operation is turned off), and from when the first detector 110 no longer detects the accelerator operation to when the second detector 120 detects the brake operation (from when the accelerator operation is turned off to when the brake operation is turned on). Further, the control unit 160 controls the notification unit 140 so that an increase rate of the notification intensity of the risk notification is different between the period of time from when the risk is detected to when the accelerator operation is turned off and the period of time from when the accelerator operation is turned off to when the brake operation is turned on, for example, an increase rate of the notification intensity of the risk notification from when the risk is detected to when the accelerator operation is turned off is larger than an increase rate of the notification intensity of the risk notification from when the accelerator operation is turned off to when the brake operation is turned on.

Figure 6:
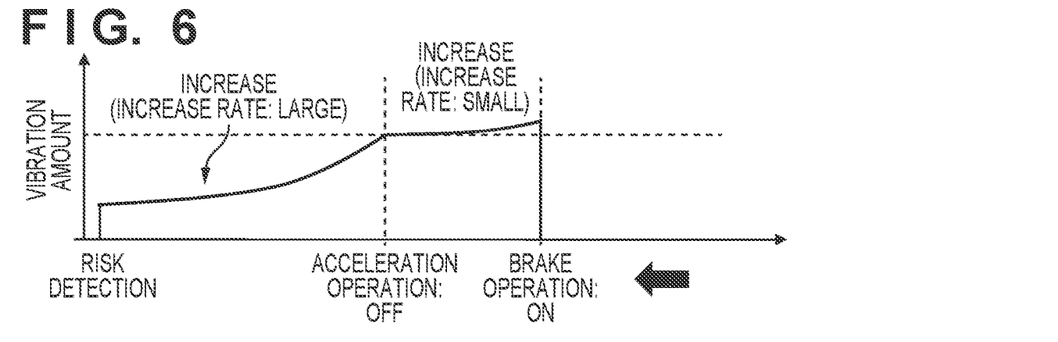
FIG. 6 is a diagram for describing a collision reducing brake in the present embodiment.

In the present embodiment, since the risk notification is performed by vibrating the steering wheel 31 gripped by the driver with the vibrating element 317, as illustrated in FIG. 6, the vibration amount of the steering wheel 31 caused by the vibrating element 317 is gradually increased from when a risk is detected to when the accelerator operation is turned off, and from when the accelerator operation is turned off to when the brake operation is turned on. An increase rate of the vibration amount of the steering wheel 31 from when the risk is detected to when the accelerator operation is turned off is set to be larger than an increase rate of the vibration amount of the steering wheel 31 from when the accelerator operation is turned off to when the brake operation is turned on. As described above, the risk notification in which the vibration amount of the steering wheel 31 is strong and the steering wheel is vibrated short is performed to the driver belonging to the second attribute in which the risk recognition degree is determined to be high and the risk recognition degree is higher than the reference, thereby making it possible to advance the timing at which the driver turns on the brake operation, leading to risk avoidance (reduction in accident risk). Further, when the brake operation is turned on, the vibration of the steering wheel 31 caused by the vibrating element 317 is stopped, thereby allowing excessive risk notification to be avoided.

As described above, by making the notification intensity of the risk notification different between the driver belonging to the first attribute and the driver belonging to the second attribute determined according to the risk recognition degree, risk notification suitable for (the attribute of) the driver can be performed, and the effect of the collision reducing brake can be sufficiently exhibited.

Note that FIGS. 5 and 6 assume a case in which the driver performs the brake operation before the ECU 29 automatically operates the brake device 11 (e.g., before the vehicle 1 enters the automatic brake operation range illustrated in FIG. 4). However, in practice, the ECU 29 may automatically operate the brake device 11 before the driver performs the brake operation. Even in such a case, in the present embodiment, the specification of the risk notification is made different between the driver belonging to the first attribute and the driver belonging to the second attribute.

Figure 7:
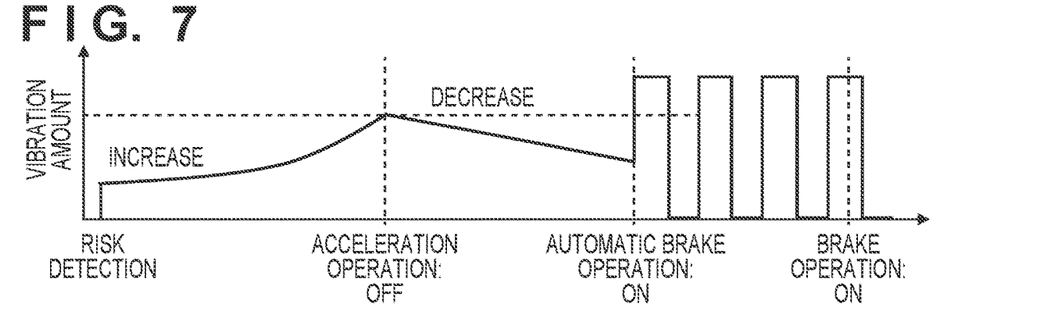
FIG. 7 is a diagram for describing a collision reducing brake in the present embodiment.

For example, for a driver having a low risk recognition degree and belonging to the first attribute in which the risk recognition degree is lower than the reference, when the ECU 29 automatically operates the brake device 11 (automatic brake operation) as illustrated in FIG. 7, the vibration amount of the steering wheel 31 is made larger than that before the brake device 11 is automatically operated, and the steering wheel 31 is intermittently vibrated. Even when the brake operation is turned on, the intermittent vibration of the steering wheel 31 is continued until the vehicle 1 completely stops. By performing such risk notification to the driver having a low risk recognition degree and belonging to the first attribute in which the risk recognition degree is lower than the reference, it is possible to urge the driver to perform the brake operation, leading to risk avoidance (reduction in accident risk).

Figure 8:
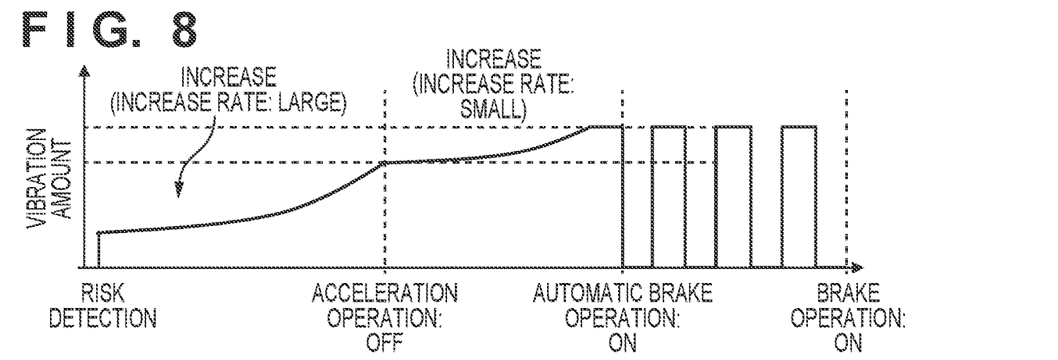
FIG. 8 is a diagram for describing a collision reducing brake in the present embodiment.

On the other hand, for a driver having a high risk recognition degree and belonging to the second attribute in which the risk recognition degree is higher than the reference, when the ECU 29 automatically operates the brake device 11 (automatic brake operation) as illustrated in FIG. 8, the vibration amount of the steering wheel 31 is made equal to that before the brake device 11 is automatically operated, and the steering wheel 31 is intermittently vibrated. When the brake operation is turned on, the intermittent vibration of the steering wheel 31 is stopped. By performing such risk notification to the driver having a high risk recognition degree and belonging to the second attribute in which the risk recognition degree is higher than the reference, it is possible to avoid excessive risk notification while urging the driver to perform the brake operation, leading to risk avoidance (reduction in accident risk).

In the present embodiment, in the risk notification, the steering wheel 31 is vibrated by driving all of the six vibrating elements 317 incorporated in the steering wheel 31, but the number of vibrating elements 317 driven to vibrate the steering wheel 31 is not limited. In other words, in the risk notification, at least one vibrating element 317 may be driven to vibrate the steering wheel 31.

In the risk notification, the steering wheel 31 may be vibrated by aligning with the position of the risk present in the surrounding situation of the vehicle 1 detected by the third detector 130 and driving only the vibrating element 317 incorporated at the position corresponding to the position of the risk among the six vibrating elements 317 incorporated in the steering wheel 31. This makes it possible to cause the driver to recognize the position of the risk present in the surrounding situation of the vehicle 1.

In the present embodiment, the case in which the notification unit 140 includes the vibrating elements 317 incorporated in the steering wheel 31 and the ECU 21 connected to the vibrating elements 317 has been described as an example, but not limited thereto. For example, instead of the vibrating elements 317 and the ECU 21, the notification unit 140 may include an instrument panel 10b1 and a head-up display 10b2 provided in the vehicle 1, and the ECU 28 connected to the instrument panel 10b1 and the head-up display 10b2 (display device 10b). In general, a driver having a low risk recognition degree tends not to frequently see information displayed on the display device 10b, and a driver having a high risk recognition degree tends to frequently see the information displayed on the display device 10b. Therefore, the control unit 160 controls the notification unit 140 so that the risk notification is performed to a driver having a low risk recognition degree and belonging to the first attribute in which the risk recognition degree is lower than the reference via the head-up display 10b2, and so that the risk notification is performed to a driver have a high risk recognition degree and belonging to the second attribute in which the risk recognition degree is higher than the reference via the instrument panel 10b1. As described above, by switching a display portion that performs risk notification according to the risk recognition degree, risk notification suitable for (the attribute of) the driver can be performed, and the effect of the collision reducing brake can be sufficiently exhibited.

In addition to the vibrating elements 317 and the ECU 21, the notification unit 140 may include an instrument panel 10b1 and a head-up display 10b2 provided in the vehicle 1, and the ECU 28 connected to the instrument panel 10b1 and the head-up display 10b2 (display device 10b). In this case, the control unit 160 controls the notification unit 140 so that the risk notification is performed by vibrating the steering wheel 31 gripped by the driver with the vibrating element 317 as described with reference to FIGS. 5 to 8, in response to the risk present in the surrounding situation of the vehicle 1 detected by the third detector 130. Further, the control unit 160 controls the notification unit 140 so as to display an image for causing the driver having a low risk recognition degree and belonging to the first attribute in which the risk recognition degree is lower than the reference to recognize a risk associated with traveling of the vehicle 1 on the head-up display 10b2, and so as to display an image for causing the driver having a high risk recognition degree and belonging to the second attribute in which the risk recognition degree is higher than the reference to recognize the risk associated with traveling of the vehicle 1 on the instrument panel 10b1. As described above, by performing the risk notification using the display device 10b in addition to the risk notification using the vibrating element 317 that vibrates the steering wheel 31, it is possible to cause the driver to reliably recognize the risk present in the surrounding situation of the vehicle 1 detected by the third detector 130. In addition, by performing risk notification suitable for (the attribute of) the driver, the effect of the collision reducing brake can be sufficiently exhibited.

The determination of the risk recognition degree and attribute of the driver by the determination unit 150 is preferably performed periodically or every predetermined number of times of driving. In this manner, by periodically determining the risk recognition degree and attribute of the driver, it is possible to reflect the acceptability of the driver, that is, a change in the driver's recognition of the risk associated with traveling of the vehicle 1 present in the surrounding situation of the vehicle 1.

In the present embodiment, the collision reducing brake has been described as an example of the driving assistance technique, but not limited thereto. The present invention can be applied in various driving assistance techniques including, for example, lane deviation suppression.

As described above, according to the vehicle 1 of the present embodiment, particularly, the driving assistance device 100, a new technique advantageous for assisting driving of a vehicle represented by a four-wheeled vehicle can be provided.

Summary of Embodiments

1. The driving assistance device of the above-described embodiment is a driving assistance device (e.g., 100) that assists driving of a vehicle (e.g., 1), the driving assistance device including:

a first detector (e.g., 110) configured to detect a driver's accelerator operation on an accelerator operator (e.g., 7A) provided in the vehicle;

a second detector (e.g., 120) configured to detect a driver's brake operation on a brake operator (e.g., 7B) provided in the vehicle;

a third detector (e.g., 130) configured to detect a surrounding situation of the vehicle;

a notification unit (e.g., 140) configured to perform notification for recognition of a risk associated with traveling of the vehicle present in the surrounding situation detected by the third detector to a driver of the vehicle;

a determination unit (e.g., 150) configured to determine a degree of recognition of the risk by the driver based on a period of time from when the first detector no longer detects the accelerator operation to when the second detector detects the brake operation in response to the risk present in the surrounding situation detected by the third detector; and a control unit (e.g., 160) configured to control the notification unit so that the notification according to the degree of recognition determined by the determination unit is performed.

According to this embodiment, since risk notification suitable for (the risk recognition degree of) the driver can be performed, an effect of a driving assistance technique (collision reducing brake) can be sufficiently exhibited without giving the driver a sense of discomfort to the risk notification.

2. According to the above-described driving assistance device (e.g., 100), the control unit (e.g., 160) controls the notification unit (e.g., 140) so as to change a specification of the notification according to the degree of recognition determined by the determination unit (e.g., 150).

According to this embodiment, since risk notification suitable for the driver can be performed, the effect of the driving assistance technique can be sufficiently exhibited without giving the driver a sense of discomfort to the risk notification.

3. In the above-described driving assistance device (e.g., 100), the third detector (e.g., 130) detects, as a surrounding situation of the vehicle (e.g., 1), a situation ahead in an advancing direction of the vehicle.

According to this embodiment, it is possible to eliminate a risk outside the standard to be excluded when the degree of recognition of the risk by the driver is determined.

4. In the above-described driving assistance device (e.g., 100), when an operation amount of the accelerator operator (e.g., 7A) corresponding to the accelerator operation detected by the first detector (e.g., 110) in response to the risk present in the surrounding situation detected by the third detector (e.g., 130) is equal to or less than a predetermined operation amount, the control unit (e.g., 160) controls the notification unit (e.g., 140) so that a timing of starting the notification is earlier than a reference timing.

According to this embodiment, the risk present in the surrounding situation of the vehicle can be recognized early.

5. In the above-described driving assistance device (e.g., 100), the determination unit (e.g., 150)

determines that a driver of the vehicle (e.g., 1) belongs to a first attribute in which a degree of recognition of the risk is lower than a reference when the period of time is equal to or longer than a reference time; and determines that the driver of the vehicle belongs to a second attribute in which the degree of recognition of the risk is higher than the reference when the period of time is shorter than the reference time, and the control unit (e.g., 160) controls the notification unit so that a notification intensity of the notification is made different between the driver belonging to the first attribute and the driver belonging to the second attribute.

According to this embodiment, risk notification suitable for (the attribute of) the driver can be performed, and the effect of the driving assistance technique can be sufficiently exhibited.

6. In the above-described driving assistance device (e.g., 100), when a driver of the vehicle (e.g., 1) belongs to the first attribute, the control unit (e.g., 160) controls the notification unit (e.g., 140) so that the notification intensity gradually increases until the first detector (e.g., 110) no longer detects the accelerator operation, and the notification intensity gradually decreases from when the first detector no longer detects the accelerator operation to when the second detector (e.g., 120) detects a predetermined amount of the brake operation.

According to this embodiment, it is possible to advance the timing at which the driver belonging to the first attribute in which the degree of recognition of the risk is lower than the reference turns off the accelerator operation, leading to risk avoidance (reduction in accident risk).

7. In the above-described driving assistance device (e.g., 100), when a driver of the vehicle (e.g., 1) belongs to the second attribute, the control unit (e.g., 160) controls the notification unit (e.g., 140) so that the notification intensity gradually increases until the first detector (e.g., 110) no longer detects the accelerator operation and until the second detector (e.g., 120) detects the brake operation.

According to this embodiment, it is possible to advance the timing at which the driver belonging to the second attribute in which the degree of recognition of the risk is higher than the reference turns on the brake operation, leading to risk avoidance (reduction in accident risk).

8. In the above-described driving assistance device (e.g., 100), when a driver of the vehicle (e.g., 1) belongs to the second attribute, the control unit (e.g., 160) controls the notification unit (e.g., 140) so that an increase rate of the notification intensity is different between a period of time until the first detector (e.g., 110) no longer detects the accelerator operation and a period of time until the second detector (e.g., 120) detects the brake operation.

According to this embodiment, it is possible to advance the timing at which the driver belonging to the second attribute in which the degree of recognition of the risk is higher than the reference turns on the brake operation, leading to risk avoidance.

9. In the above-described driving assistance device (e.g., 100), the control unit (e.g., 160) controls the notification unit (e.g., 140) so that an increase rate of the notification intensity for the period of time until the first detector (e.g., 110) no longer detects the accelerator operation is larger than an increase rate of the notification intensity for the period of time until the second detector (e.g., 120) detects the brake operation.

According to this embodiment, it is possible to advance the timing at which the driver belonging to the second attribute in which the degree of recognition of the risk is higher than the reference turns on the brake operation, leading to risk avoidance.

10. In the above-described driving assistance device (e.g., 100), the notification unit (e.g., 140) includes a vibrating element (e.g., 317) configured to vibrate a steering wheel (e.g., 31) of the vehicle (e.g., 1), and the control unit (e.g., 160) controls the notification unit so as to change a vibration amount of the steering wheel (e.g., 31) caused by the vibrating element (e.g., 317) according to the degree of recognition determined by the determination unit (e.g., 150).

According to this embodiment, it is possible to perform notification for recognition of a risk associated with traveling of the vehicle by vibrating the steering wheel.

11. In the above-described driving assistance device (e.g., 100), the notification unit (e.g., 140) includes an instrument panel (e.g., 10*b*1) provided in the vehicle (e.g., 1) and a head-up display (e.g., 10*b*2) provided above the instrument panel, and the control unit (e.g., 160)

controls the notification unit so that the notification is performed via the head-up display when a driver of the vehicle belongs to the first attribute, and controls the notification unit so that the notification is performed via the instrument panel when a driver of the vehicle belongs to the second attribute.

According to this embodiment, risk notification suitable for the driver can be performed using the instrument panel and the head-up display, and the effect of the driving assistance technique can be sufficiently exhibited.

12. In the above-described driving assistance device (e.g., 100), the control unit (e.g., 160)

causes an instrument panel (e.g., 10*b*1) provided in the vehicle to display an image for recognizing a risk associated with traveling of the vehicle present in the surrounding situation detected by the third detector (e.g., 130) when a driver of the vehicle (e.g., 1) belongs to the second attribute; and causes a head-up display (e.g., 10*b*2) provided above the instrument panel to display an image for recognizing a risk associated with traveling of the vehicle present in the surrounding situation detected by the third detector when a driver of the vehicle belongs to the first attribute.

According to the present embodiment, it is possible to cause the driver to reliably recognize the risk present in the surrounding situation of the vehicle.

13. The vehicle (e.g., 1) of the above-described embodiment includes a first detector (e.g., 110) configured to detect a driver's accelerator operation on an accelerator operator (e.g., 7A) provided in the vehicle;

a second detector (e.g., 120) configured to detect a driver's brake operation on a brake operator (e.g., 7B) provided in the vehicle;

a third detector (e.g., 130) configured to detect a surrounding situation of the vehicle;

a notification unit (e.g., 140) configured to perform notification for recognition of a risk associated with traveling of the vehicle present in the surrounding situation detected by the third detector to a driver of the vehicle;

a determination unit (e.g., 150) configured to determine a degree of recognition of the risk by the driver based on a period of time from when the first detector no longer detects the accelerator operation to when the second detector detects the brake operation in response to the risk present in the surrounding situation detected by the third detector; and a control unit (e.g., 160) configured to control the notification unit so that the notification according to the degree of recognition determined by the determination unit is performed.

According to this embodiment, since risk notification suitable for (the risk recognition degree of) the driver can be performed, the effect of the driving assistance technique (collision reducing brake) can be sufficiently exhibited without giving the driver a sense of discomfort to the risk notification.

The invention is not limited to the foregoing embodiments, and various variations/changes are possible within the spirit of the invention.

What is claimed is:

1. A driving assistance device that assists driving of a vehicle, the driving assistance device comprising:
   a first detector configured to detect a driver's accelerator operation on an accelerator operator provided in the vehicle;
   a second detector configured to detect a driver's brake operation on a brake operator provided in the vehicle;
   a third detector configured to detect a surrounding situation of the vehicle;
   a notification unit configured to perform notification for recognition of a risk associated with traveling of the vehicle present in the surrounding situation detected by the third detector to a driver of the vehicle;
   a determination unit configured to determine a degree of recognition of the risk by the driver based on a period of time from when the first detector no longer detects the accelerator operation to when the second detector detects the brake operation in response to the risk present in the surrounding situation detected by the third detector; and
   a control unit configured to control the notification unit so that the notification according to the degree of recognition determined by the determination unit is performed,
   wherein when an operation amount of the accelerator operator corresponding to the accelerator operation detected by the first detector in response to the risk present in the surrounding situation detected by the third detector is equal to or less than a predetermined operation amount, the control unit controls the notification unit so that a timing of starting the notification is earlier than a reference timing.

2. The driving assistance device according to claim 1, wherein the control unit controls the notification unit so as to change a specification of the notification according to the degree of recognition determined by the determination unit.

3. The driving assistance device according to claim 1, wherein the third detector detects, as a surrounding situation of the vehicle, a situation ahead in an advancing direction of the vehicle.

4. The driving assistance device according to claim 1, wherein the determination unit
   determines that a driver of the vehicle belongs to a first attribute in which a degree of recognition of the risk is lower than a reference when the period of time is equal to or longer than a reference time; and
   determines that the driver of the vehicle belongs to a second attribute in which the degree of recognition of the risk is higher than the reference when the period of time is shorter than the reference time, and
   the control unit controls the notification unit so that a notification intensity of the notification is made different between the driver belonging to the first attribute and the driver belonging to the second attribute.

5. The driving assistance device according to claim 4, wherein when a driver of the vehicle belongs to the first attribute, the control unit controls the notification unit so that the notification intensity gradually increases until the first detector no longer detects the accelerator operation, and the notification intensity gradually decreases from when the first detector no longer detects the accelerator operation to when the second detector detects a predetermined amount of the brake operation.

6. The driving assistance device according to claim 4, wherein when a driver of the vehicle belongs to the second attribute, the control unit controls the notification unit so that the notification intensity gradually increases until the first detector no longer detects the accelerator operation and until the second detector detects the brake operation.

7. The driving assistance device according to claim 6, wherein when a driver of the vehicle belongs to the second attribute, the control unit controls the notification unit so that an increase rate of the notification intensity is different between a period of time until the first detector no longer detects the accelerator operation and a period of time until the second detector detects the brake operation.

8. The driving assistance device according to claim 7, wherein the control unit controls the notification unit so that an increase rate of the notification intensity for the period of time until the first detector no longer detects the accelerator operation is larger than an increase rate of the notification intensity for the period of time until the second detector detects the brake operation.

9. The driving assistance device according to claim 1, wherein the notification unit comprises a vibrating element configured to vibrate a steering wheel of the vehicle, and
the control unit controls the notification unit so as to change a vibration amount of the steering wheel caused by the vibrating element according to the degree of recognition determined by the determination unit.

10. The driving assistance device according to claim 4, wherein the notification unit comprises an instrument panel provided in the vehicle; and a head-up display provided above the instrument panel, and
the control unit
controls the notification unit so that the notification is performed via the head-up display when a driver of the vehicle belongs to the first attribute, and
controls the notification unit so that the notification is performed via the instrument panel when a driver of the vehicle belongs to the second attribute.

11. The driving assistance device according to claim 4, wherein the control unit
causes an instrument panel provided in the vehicle to display an image for recognizing a risk associated with traveling of the vehicle present in the surrounding situation detected by the third detector when a driver of the vehicle belongs to the second attribute; and
causes a head-up display provided above the instrument panel to display an image for recognizing a risk associated with traveling of the vehicle present in the surrounding situation detected by the third detector when a driver of the vehicle belongs to the first attribute.

12. A vehicle comprising:
a first detector configured to detect a driver's accelerator operation on an accelerator operator provided in the vehicle;
a second detector configured to detect a driver's brake operation on a brake operator provided in the vehicle;
a third detector configured to detect a surrounding situation of the vehicle;
a notification unit configured to perform notification for recognition of a risk associated with traveling of the vehicle present in the surrounding situation detected by the third detector to a driver of the vehicle;
a determination unit configured to determine a degree of recognition of the risk by the driver based on a period of time from when the first detector no longer detects the accelerator operation to when the second detector detects the brake operation in response to the risk present in the surrounding situation detected by the third detector; and
a control unit configured to control the notification unit so that the notification according to the degree of recognition determined by the determination unit is performed,
wherein when an operation amount of the accelerator operator corresponding to the accelerator operation detected by the first detector in response to the risk present in the surrounding situation detected by the third detector is equal to or less than a predetermined operation amount, the control unit controls the notification unit so that a timing of starting the notification is earlier than a reference timing.

13. A driving assistance device that assists driving of a vehicle, the driving assistance device comprising:
a first detector configured to detect a driver's accelerator operation on an accelerator operator provided in the vehicle;
a second detector configured to detect a driver's brake operation on a brake operator provided in the vehicle;
a third detector configured to detect a surrounding situation of the vehicle;
a notification unit configured to perform notification for recognition of a risk associated with traveling of the vehicle present in the surrounding situation detected by the third detector to a driver of the vehicle;
a determination unit configured to determine a degree of recognition of the risk by the driver based on a period of time from when the first detector no longer detects the accelerator operation to when the second detector detects the brake operation in response to the risk present in the surrounding situation detected by the third detector; and
a control unit configured to control the notification unit so that the notification according to the degree of recognition determined by the determination unit is performed,
wherein the determination unit
determines that a driver of the vehicle belongs to a first attribute in which a degree of recognition of the risk is lower than a reference when the period of time is equal to or longer than a reference time; and
determines that the driver of the vehicle belongs to a second attribute in which the degree of recognition of the risk is higher than the reference when the period of time is shorter than the reference time, and
the control unit controls the notification unit so that a notification intensity of the notification is made different between the driver belonging to the first attribute and the driver belonging to the second attribute.

* * * * *